United States Patent
Visser et al.

(10) Patent No.: US 9,590,911 B2
(45) Date of Patent: Mar. 7, 2017

(54) WIRELESS AREA NETWORK (WAN) OVERLOADING

(71) Applicant: iPhotonix, Richardson, TX (US)

(72) Inventors: Lance Arnold Visser, Dallas, TX (US); Russell Wiant, Carrollton, TX (US)

(73) Assignee: iPhotonix, Richardson, TX (US)

( * ) Notice: Subject to any disclaimer, the term of this patent is extended or adjusted under 35 U.S.C. 154(b) by 3 days.

(21) Appl. No.: 14/749,317

(22) Filed: Jun. 24, 2015

(65) Prior Publication Data
US 2015/0381503 A1  Dec. 31, 2015

Related U.S. Application Data

(60) Provisional application No. 62/018,433, filed on Jun. 27, 2014.

(51) Int. Cl.
| | | |
|---|---|---|
| *H04L 12/851* | (2013.01) | |
| *H04L 12/28* | (2006.01) | |
| *H04L 29/06* | (2006.01) | |
| *H04L 12/823* | (2013.01) | |

(52) U.S. Cl.
CPC ...... *H04L 47/2441* (2013.01); *H04L 12/2874* (2013.01); *H04L 63/083* (2013.01); *H04L 47/32* (2013.01); *H04L 63/029* (2013.01)

(58) Field of Classification Search
CPC . H04L 47/2441; H04L 47/32; H04L 12/2874; H04L 63/083
See application file for complete search history.

(56) References Cited

U.S. PATENT DOCUMENTS

| | | | |
|---|---|---|---|
| 2005/0141518 A1 | 6/2005 | Schiller et al. | |
| 2006/0209830 A1 | 9/2006 | Oguchi et al. | |
| 2008/0095054 A1* | 4/2008 | Morford | H04L 41/0896 370/231 |
| 2009/0144819 A1* | 6/2009 | Babbar | H04L 63/164 726/13 |
| 2009/0279550 A1* | 11/2009 | Romrell | H04L 12/4633 370/395.4 |

(Continued)

OTHER PUBLICATIONS

"CPE WAN Management Protocol," TR-069, Issue 1, Amendment 5, CWMP Version 1.4, Broadband Forum, Nov. 2013, 228 pages.

*Primary Examiner* — Albert T Chou
(74) *Attorney, Agent, or Firm* — Slater Matsil, LLP

(57) ABSTRACT

Incoming packets communicated over a common WAN interface of a distributed host device may be processed differently depending on their traffic classification. A virtual forwarding unit classifies incoming packets as tunneled traffic, tunnel-related control traffic, remote agent traffic, or local internet traffic. Tunneled traffic classifies packets transported over data or control tunnels extending between WAN interfaces of distributed host devices. Tunnel-related control traffic classifies packets communicated to measure a quality parameter of the data or control tunnels, such as operations, administration and maintenance (OAM) packets. Remote agent traffic classifies packets associated with existing remote agent sessions, which are created and tracked based on outgoing management traffic originating from the virtual remote agent. Local internet traffic classifies packets associated with existing local internet sessions, which are created and tracked based on outgoing local internet traffic.

20 Claims, 16 Drawing Sheets

(56) References Cited

U.S. PATENT DOCUMENTS

| | | |
|---|---|---|
| 2010/0142369 A1 | 6/2010 | Gottwerth et al. |
| 2010/0284407 A1 | 11/2010 | Leelanivas et al. |
| 2011/0170865 A1* | 7/2011 | Zheng ............... H04L 45/50 398/43 |
| 2012/0170578 A1* | 7/2012 | Anumala ......... H04L 12/1886 370/390 |
| 2012/0263041 A1* | 10/2012 | Giaretta ........... H04L 47/2441 370/236 |
| 2012/0263183 A1* | 10/2012 | Weill ............... H04L 12/4633 370/395.53 |
| 2013/0305344 A1 | 11/2013 | Alicherry et al. |
| 2014/0133354 A1 | 5/2014 | Scharf et al. |
| 2015/0023357 A1 | 1/2015 | Imai |
| 2015/0043350 A1* | 2/2015 | Basilier ............ H04L 63/0272 370/235 |
| 2015/0188943 A1 | 7/2015 | Williams et al. |
| 2015/0326535 A1* | 11/2015 | Rao .................. H04L 63/029 726/15 |

\* cited by examiner

WIRELESS AREA NETWORK (WAN) OVERLOADING

This patent application claims priority to U.S. Provisional Application No. 62/018,433, filed on Jun. 27, 2014 and entitled "Wireless Area Network (WAN) Overloading," which is hereby incorporated by reference herein as if reproduced in its entirety.

CROSS-REFERENCE TO RELATED APPLICATIONS

This patent application is related to U.S. patent application Ser. No. 14/749,081, U.S. patent application Ser. No. 14/749,763, U.S. patent application Ser. No. 14/749,231, and U.S. patent application Ser. No. 14/749,365, each of which are incorporated by reference herein as if reproduced in their entireties.

TECHNICAL FIELD

The present invention relates generally to telecommunications, and in particular embodiments, to techniques and mechanisms for wireless area network (WAN) overloading.

BACKGROUND

Small and medium businesses (SMBs) are becoming increasingly data intensive as industries adapt to the information age. This has created a demand for cost-effective network solutions capable of efficiently delivering services across distributed locations in a secure and reliable manner. Notably, conventional enterprise networks are designed primarily for large corporations, and may be ill-suited for many SMB applications. Specifically, conventional enterprise networks typically require technical support at the network edge in order to deploy and service network equipment in remote office locations. Since many SMB clients do not employ on-site information technology (IT) personnel, the deployment and maintenance of conventional enterprise network equipment in SMB remote offices may require service calls by certified technicians, which may significantly increase the up-front and/or operational expenses of providing conventional enterprise networks to SMB clients. Accordingly, techniques and systems for providing affordable, yet capable, network solutions to SMB clients are desired.

SUMMARY OF THE INVENTION

Technical advantages are generally achieved, by embodiments of this disclosure which describe for wireless area network (WAN) overloading.

In accordance with an embodiment, a method for multiplexing traffic over a single interface of a distributed host device is provided. In this example, the method comprises receiving incoming packets over a wide area network (WAN) interface of a local host device. One or more tunnels extend from the WAN interface of the local host device to remote WAN interfaces of remote host devices. Incoming packets are stored in a virtual data forwarding unit instantiated on the local host device. The method further includes assigning one of a plurality of classifications to the incoming packets. The plurality of traffic classifications include at least tunneled traffic, tunnel-related control traffic, and remote agent traffic. The tunneled traffic classifies packets transported over the one or more tunnels. The tunnel-related control traffic classifies packets communicated to measure a quality parameter of the one or more tunnels. The remote agent traffic classifies packets associated with a virtual remote agent instantiated on the local host device. The method further includes attempting to validate the incoming packets using authentication procedures associated with the assigned traffic classifications. Different authentication procedures are associated with different traffic classifications, and incoming packets deemed invalid are dropped from the virtual buffer. The method further includes processing or forwarding incoming packets that are successfully validated. An apparatus and computer program product for performing this method are also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1A:
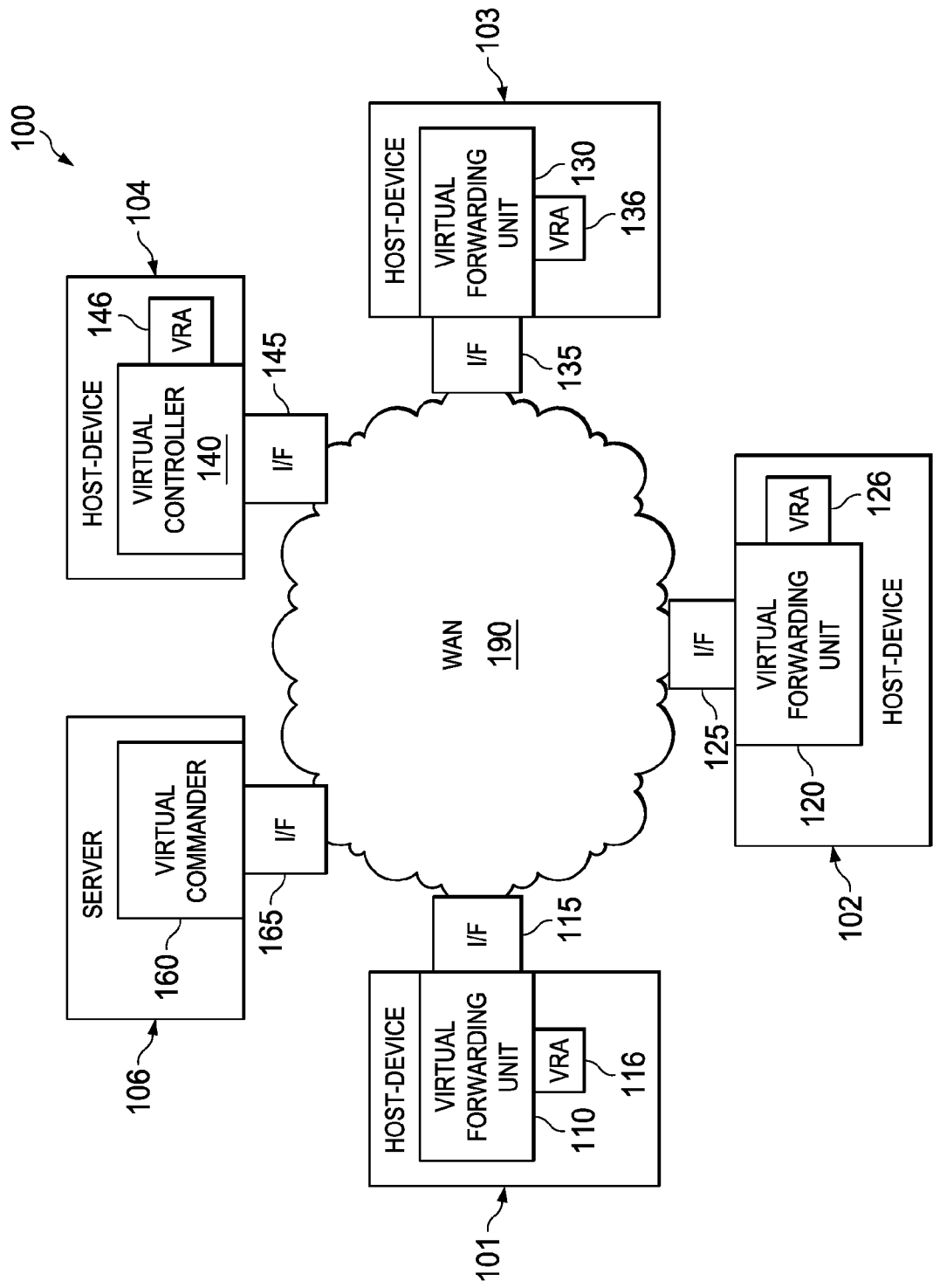
FIGS. 1A-1E illustrate diagrams of an embodiment virtual edge router network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While much of this disclosure discusses virtual networking solutions for SMB clients, those of ordinary skill in the art will recognize that the underlying concepts are scalable to any size system, including (but not limited to) large enterprise networks. Various concepts are disclosed in U.S. Provisional Patent Application 62/018,350, U.S. Provisional Patent Application 62/018,389, U.S. Provisional Patent Application 62/018,398, U.S. Provisional Patent Application 62/018,408, U.S. Provisional Patent Application 62/018,421, U.S. Provisional Patent Application 62/018,433, U.S. Provisional Patent Application 62/018,443 are, each of which are incorporated by reference herein as if reproduced in their entireties.

Innovative virtual networking architectures are described by U.S. patent application Ser. No. 14/749,081. As described therein, multiple virtual machines instantiated on a common host device may share the same wide area network (WAN) interface. For example, a virtual controller, virtual data forwarding unit and virtual remote agent instantiated on the same host device may send and receive traffic over the same WAN interface, with the internet protocol (IP) address of the WAN interface being the destination address for all incoming traffic, as well as the source address for all outgoing traffic. In some devices, the virtual forwarding unit will serve as the gatekeeper of the distributed host device such that all incoming and outgoing traffic is funneled through virtual forwarding unit. More specifically, the virtual forwarding unit will classify, validate, and (if warranted) distribute incoming packets to virtual machines or interfaces of the local host device. The virtual forwarding unit will also process all outgoing traffic prior to forwarding it over the WAN interface of the local host device. For example, the virtual forwarding unit may encrypt and/or encapsulate outgoing tunneled traffic prior to forwarding it over the WAN interface of the local host device.

In many cases, the virtual remote agent may need to apply different processing/validation steps to different types of traffic. For example, incoming local internet traffic may need to be filtered based on existing local internet sessions, while incoming tunneled traffic may need to be validated based on decryption keys. As another example, outgoing remote agent traffic may need to be monitored to track existing remote agent sessions, while outgoing tunneled traffic may need to be encrypted and encapsulated using the appropriate keys and next-hop addresses. Accordingly, techniques for classifying and processing incoming and outgoing traffic at the virtual forwarding unit are needed.

Aspects of this disclosure provide techniques for processing outgoing and incoming packets received over a common WAN interface of a distributed host device. Specifically, a virtual forwarding unit tracks existing remote agent sessions based on outgoing management traffic originating from the virtual remote agent. The virtual forwarding agent also tracks existing local internet sessions based on outgoing local internet traffic on distributed host devices configured with that capability. The virtual forwarding unit then classifies incoming packets as tunneled traffic, tunnel-related control traffic, remote agent traffic, or local internet traffic. Tunneled traffic classifies packets transported over data or control tunnels extending between the WAN interface of the distributed host device and WAN interfaces of remote host devices. Tunnel-related control traffic classifies packets communicated to measure a quality parameter of the data or control tunnels, such as operations, administration and maintenance (OAM) packets. Remote agent traffic classifies packets associated with an existing remote agent session, and local internet traffic classifies packets associated with an existing local internet session. After classifying the incoming packets, the virtual forwarding agent attempts to validate those packets using an authentication protocol associated with their assigned traffic classification. More specifically, packets having different traffic classifications are validated in different ways. For example, incoming packets classified as tunneled traffic are validated based on tunnel passwords, while incoming packets classified as tunnel-related control traffic are validated based on their syntax (e.g., structure or format). Incoming packets classified as remote agent traffic or local agent traffic may be validated by comparing port information carried in the header of the incoming packet with port information in the corresponding session entry. The virtual forwarding agent then drops invalid packets, and forwards or processes validated packets. Validated remote agent traffic is forwarded to the remote agent. Other traffic is forwarded or processed based on the information in the packet or a forwarding table. For example, valid local internet traffic may be data traffic destined for a virtual machine or local interface of the local host device. Likewise, validated tunneled traffic may be data traffic destined for a virtual machine or local interface of the local host device. Alternatively, validated tunneled traffic may be control traffic destined for a virtual controller instantiated on the local host or for a control tunnel processing module of the virtual forwarding unit, e.g., a module configured to store routing tables and/or other control information on the virtual forwarding unit. Valid tunnel-related control traffic may be processed by an OAM module of the virtual forwarding unit. Techniques for processing, classifying, and validating ingress and egress traffic of a distributed host device are discussed in greater detail below.

FIGS. 1A-1D illustrate a virtual edge router 100 comprising a plurality of virtual data forwarding units 110, 120, 130, a virtual controller 140, and a plurality of virtual remote agents 116, 126, 136, 146. The virtual forwarding units 110, 120, 130, the virtual controller 140, and the virtual remote agents 116, 126, 136, 146 (referred to collectively as "virtual components") may comprise any hardware, software, or combinations thereof within the host devices 101-104. For example, one or more of the virtual components 110-146 may be a virtual machine instantiated on a corresponding one of the host devices 101-104. As another example, one or more of the virtual components 110-146 may be a dedicated hardware component (e.g., application-specific integrated circuits (ASICs), field-programmable gate arrays (FPGAs), etc.) housed by a corresponding one of the host devices 101-104. For purposes of this disclosure, an object "instantiated" on a host device refers to any instance of software and/or hardware installed-on and/or housed-by the host device. The virtual edge router 100 may be managed by a virtual commander 160, which may be instantiated on a server 106. As used herein, the term "server" may refer to any component or collection of components maintained by a managed service provider. For example, the server 106 may correspond to a network of computing devices in a cloud computing data center or in a network of distributed data centers. As shown in FIG. 1A, the host devices 101, 102, 103, 104 and the server 106 comprise wide area network (WAN) interfaces 115, 125, 135, 145, 165 (respectively) configured to communicate over a wide area network 190.

Figure 1B:
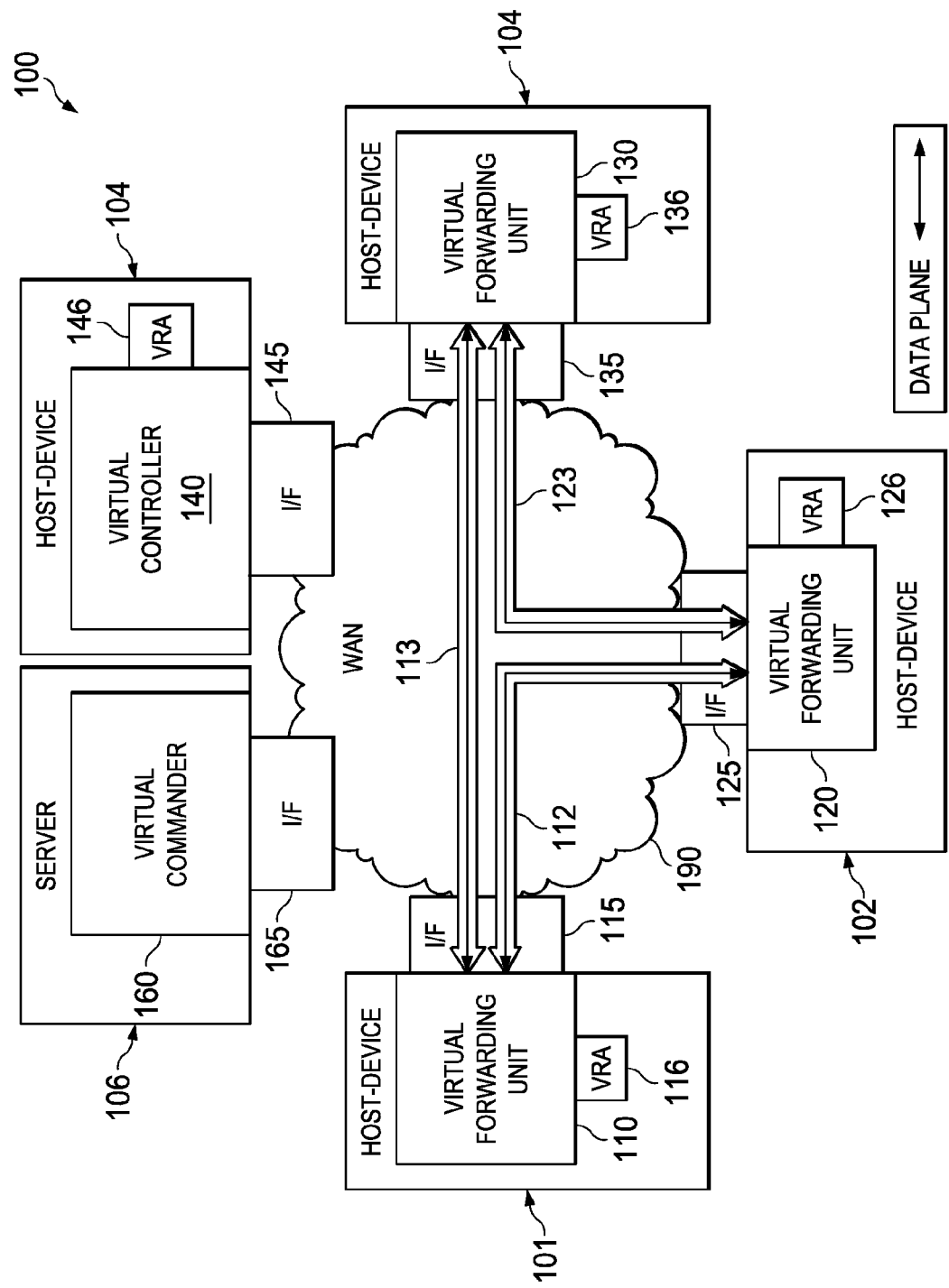

The virtual forwarding units 110-130 are data plane entities of the virtual edge router 100. The terms "virtual forwarding unit," "virtual data forwarding unit," and "virtual forwarding switch" (vFS) are used interchangeably throughout this disclosure. As shown in FIG. 1B, the virtual forwarding units 110, 120, 130 are interconnected to one another via data tunnels 112, 113, 123 extending between WAN interfaces 115, 125, 135 of the host devices 101-103. The data tunnels 112, 113, 123 collectively form a data plane of the virtual edge router 100, and correspond to virtual data pathways through the WAN 190 that are secured by a network tunneling protocol. The virtual forwarding units 110, 120, 130 may be configured to forward data packets over the data tunnels 112, 113, 123. Data packets forwarded over the data tunnels 112, 113, 123 may be transported over the WAN 190 without exiting the data plane of the virtual edge router 100. In embodiments, the virtual forwarding units 110, 120, 130 and/or or the host devices 101-103 may include LAN interfaces for communicating over a local area network with devices (e.g., computers, printers, etc.) in a remote office of an SMB client. The LAN interfaces of the virtual forwarding units 110, 120, 130 and/or or the host devices 101-103 may collectively represent LAN interfaces (or local/private interfaces) of the virtual edge router 100.

Figure 1C:
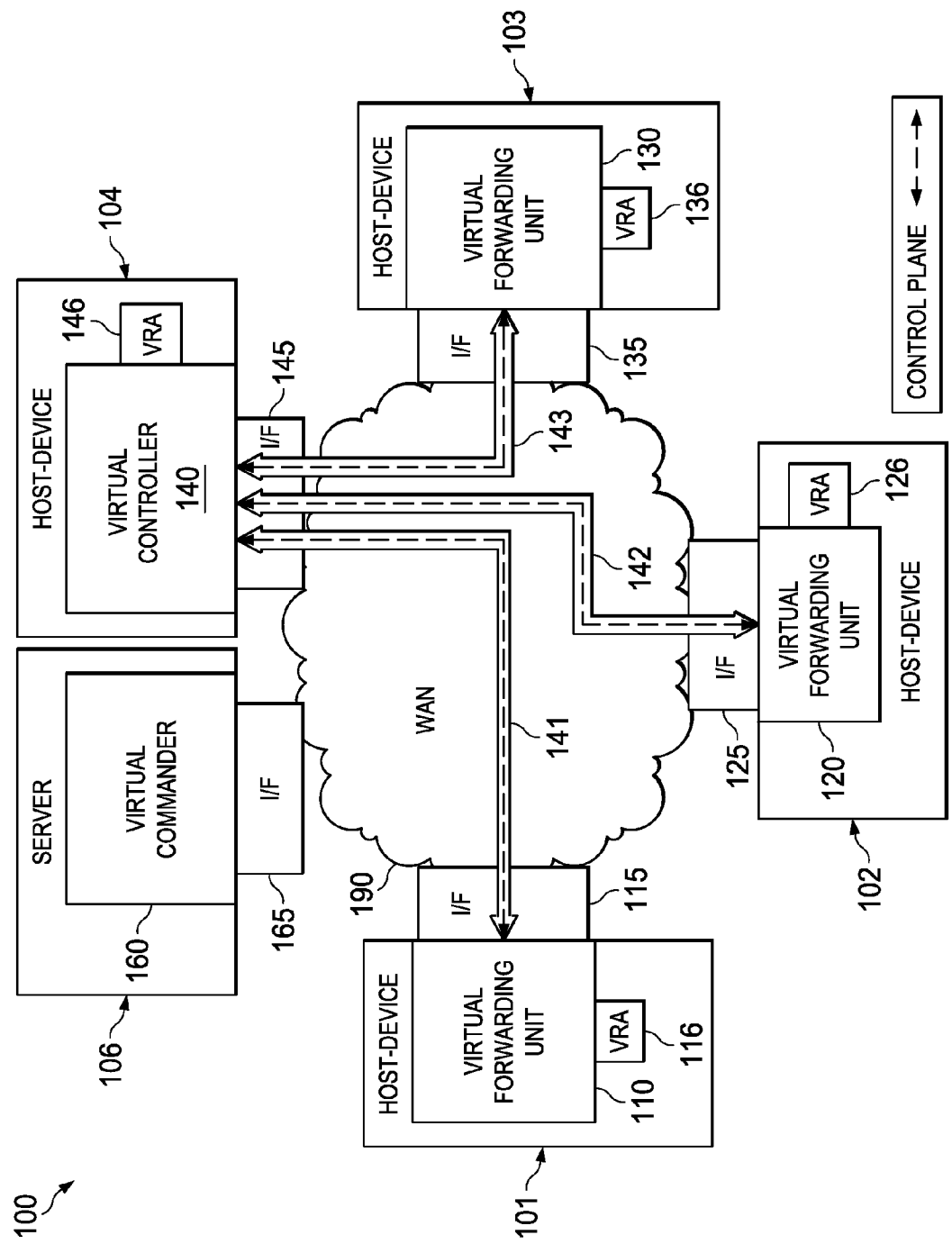

The virtual controller 140 is a control plane entity of the virtual edge router 100. The terms "virtual controller," "virtual network controller," and "virtual flow controller" (vFC) are used interchangeably throughout this disclosure. As shown in FIG. 1C, the virtual controller 140 is connected to each of the virtual forwarding units 110, 120, 130 via control tunnels 141, 142, 143 extending from the WAN interface 145 of the host device 104 to each of the WAN interfaces 115, 125, and 135 of the host devices 101-103. The control tunnels 141, 142, 143 collectively form a control plane of the virtual edge router 100. The virtual controller 140 may be configured to forward control packets over the control tunnels 141, 142, 143. Control packets forwarded over the control tunnels 141, 142, 143 may be transported over the WAN 190 without exiting the control plane of the virtual edge router 100. The virtual controller 140 may update and/or manage tables (e.g., routing, egress, etc.) in the virtual data forwarding units 110, 120, 130 via control signaling communicated over the control tunnel 141, 142, 143.

Figure 1D:
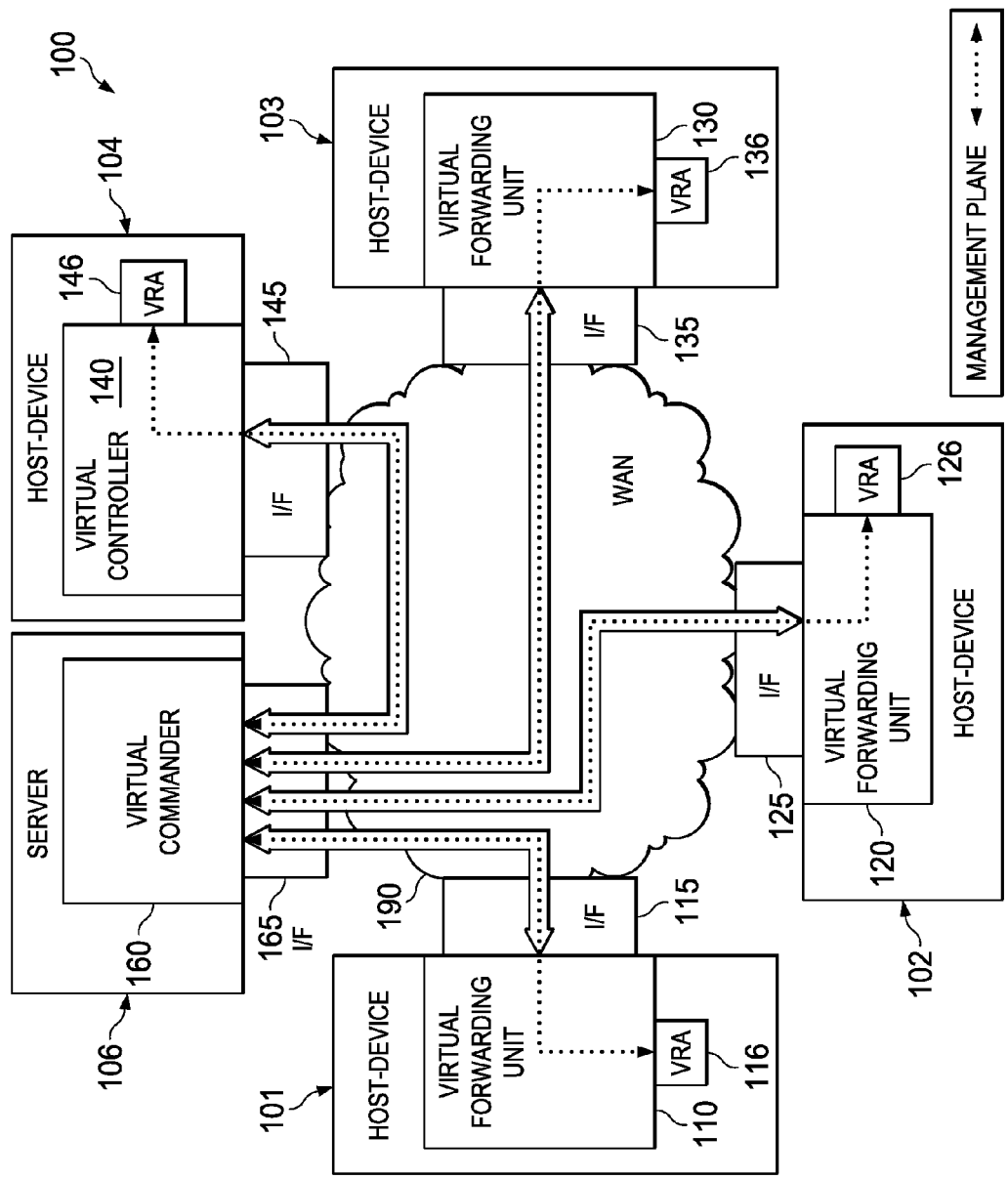

The virtual remote agents 116, 126, 136, 146 are management plane entities of the virtual edge router 100. The terms "remote agent" and "virtual remote agent" (vRA) are used interchangeably throughout this disclosure. The virtual commander 160 may be an internal management plane entity within the virtual edge router 100, or an external management device configured to manage the virtual edge router 100. The terms "virtual commander" and "virtual network commander" (vNetComm) are used interchangeably throughout this disclosure to refer to management applications in a management server. As shown in FIG. 1D, the virtual commander 160 is connected to each of the virtual remote agents 116, 126, 136, 146 via management signaling, which is transported over management tunnels 161, 162, 163 extending from the WAN interface 165 of the server 106 to each of the WAN interfaces 115, 125, 135, 145 of the host devices 101-104. The virtual remote agents 116, 126, 136, 146 and the virtual commander 160 may be configured to forward management packets over the management tunnels 161, 162, 163. Management packets forwarded over the management tunnels 161, 162, 163 may be transported over the WAN 190 without exiting the management plane of the virtual edge router 100.

Figure 1E:
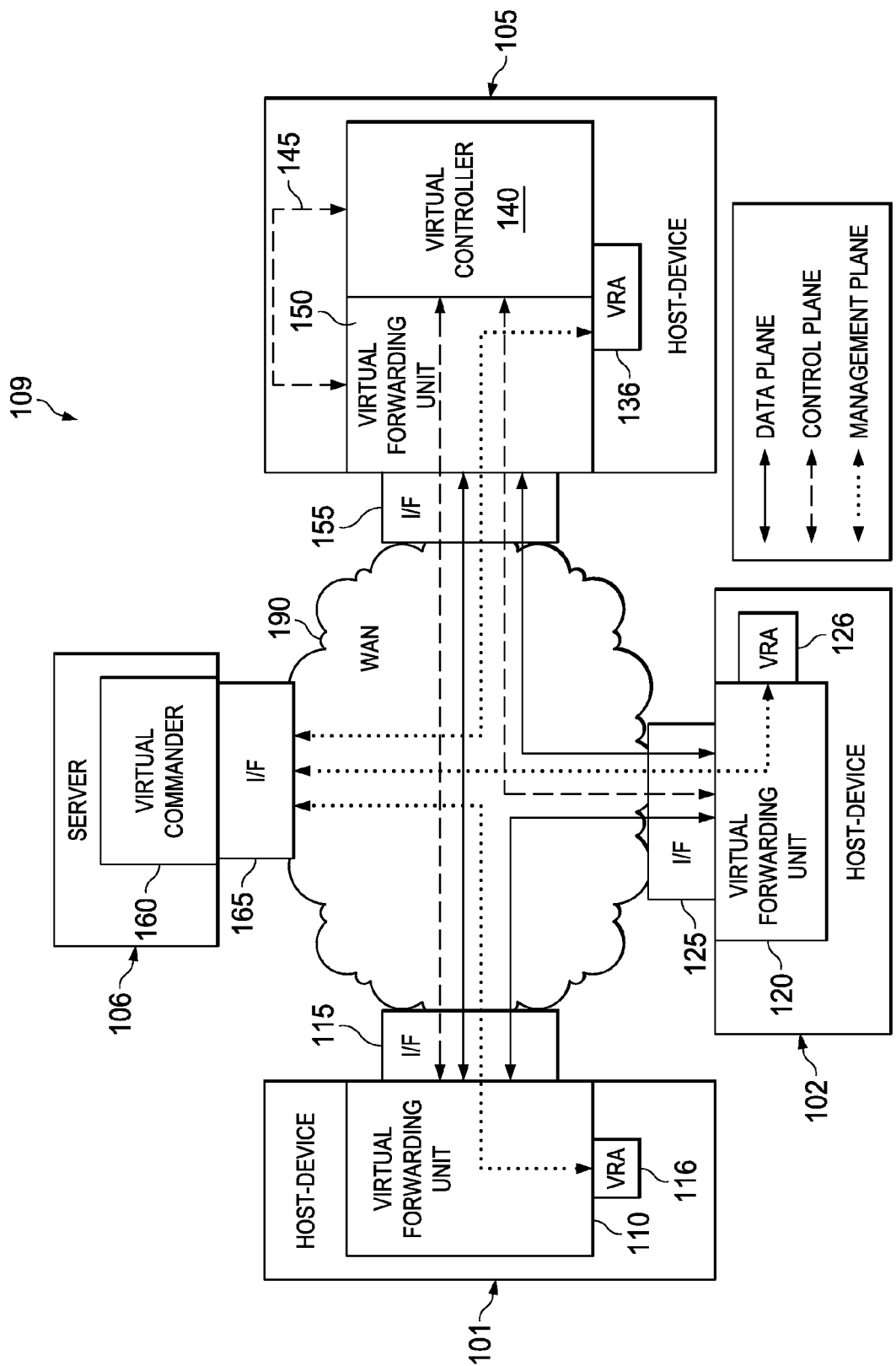

In some embodiments, a virtual controller may be co-located with a virtual forwarding unit in a common host device. FIG. 1E illustrates an embodiment virtual edge router 109 in which the virtual controller 140 and is co-located with a virtual forwarding unit 150 in a host device 105. The host device 105 includes a virtual remote agent 136 configured to manage the virtual controller 140 and the virtual forwarding unit 150. As shown, the virtual controller 140 and the virtual forwarding unit 150 share a common WAN interface 155 of the remote device, and an internal control path 145 extends between the virtual controller 140 and the virtual forwarding unit 150. While the virtual edge router 109 includes data, control, and management tunnels, those tunnels have been omitted from FIG. 1E for purposes of clarity and concision.

The data tunnels 112, 113, 123, control tunnels 141, 142, 143, and management tunnels 161, 162, 163 (referred to collectively as "tunnels") correspond to virtual pathways through the WAN 190 that are secured through one or more network tunneling protocols. In one embodiment, the same tunneling protocol is used for each of the tunnels 112-113, 123, 141-143, 161-163. In another embodiment, different tunneling protocols are used for different tunnel classifications. For example, a different tunneling protocol may be used for the data tunnels 112-113, 123 than for the control tunnels 141-143. In yet other embodiments, different tunneling protocols are used for tunnels within the same tunnel classification. For example, a different tunneling protocol may be used for the data tunnel 112 than for the data tunnel 123. Tunneling protocols may use data encryption to securely transport payloads over the WAN 190. The WAN 190 may include any wide area network or collection of wide area networks. In an embodiment, the WAN 190 corresponds to a public internet. In another embodiment, the WAN 190 corresponds to a private internet protocol (IP) network. In yet other embodiments, the WAN 190 includes a collection of public and private IP networks. The WAN 190 is not limited to IP networks, and may include networks operating under any other network delivery protocol. Unless otherwise specified, the term "wide area network" is used loosely throughout this disclosure to refer to any network (or collection of networks) that serve to interconnect two or more local area networks (LANs).

Figure 2:
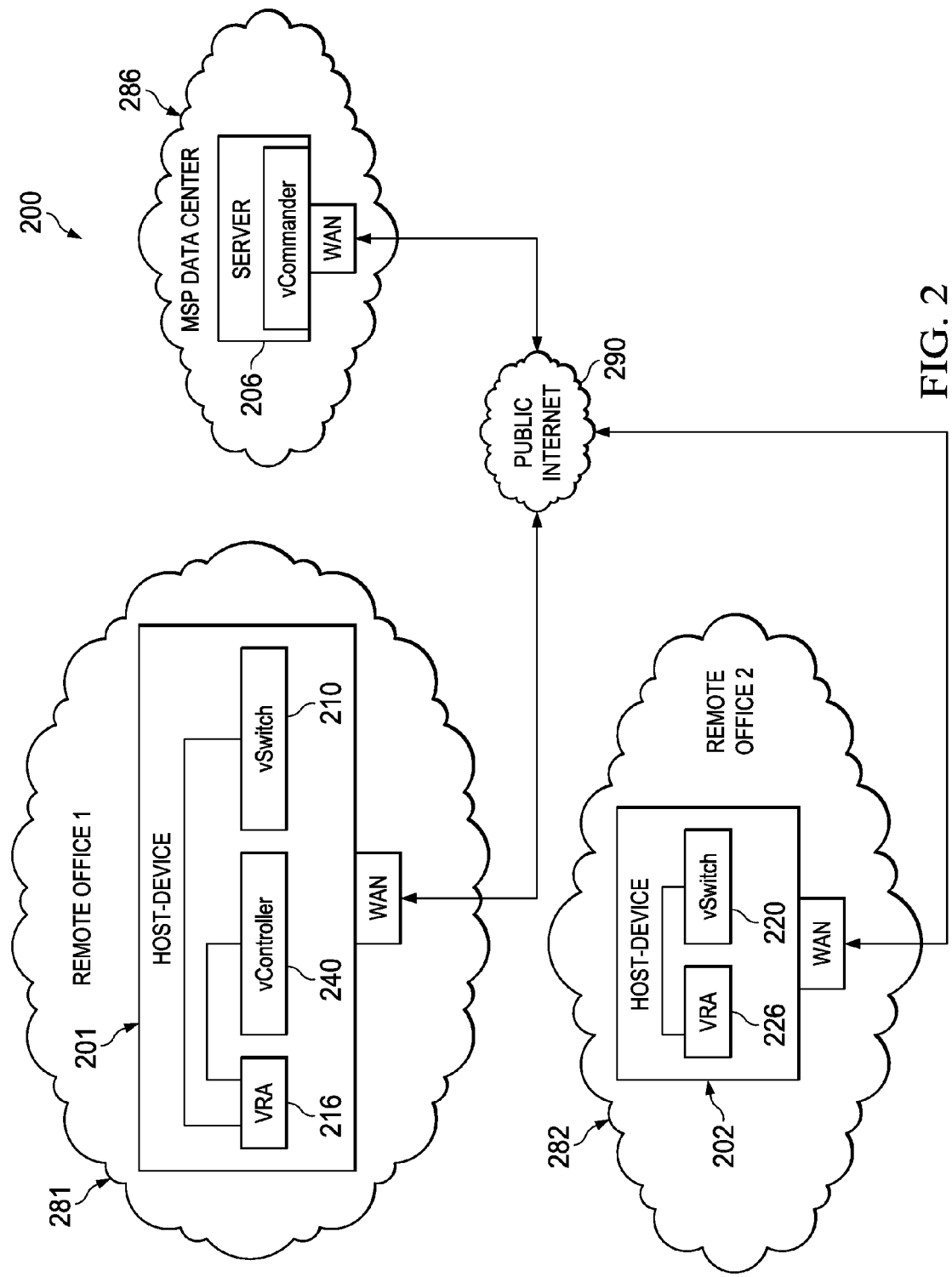
FIG. 2 illustrates a diagram of another embodiment virtual edge router networks.

In some embodiments, a virtual commander may be positioned in a management facility (or network of facilities) maintained by a managed service provider (MSP), while virtual components (e.g., virtual forwarding units, virtual controller, virtual remote agent, etc.) may be instantiated on host devices distributed across multiple remote office locations of an SMB client. FIG. 2 illustrates a virtual edge router 200 comprising a virtual data forwarding unit 210, a virtual remote agent 216, and a virtual controller 240 instantiated on a host-device 201 in a remote office 281, and a virtual data forwarding unit 220 and a virtual remote agent 226 instantiated on a host-device 202 in a remote office 282. The remote offices 281, 282 are interconnected with one another, as well as with a server 206 in a managed service provider data center 286, via a public internet 290. As discussed herein, remote office locations housing a virtual controller are referred to as head-office locations, while remote office locations housing a virtual forwarding switch (but not a virtual network controller) are referred to as branch-office locations.

Figure 3:
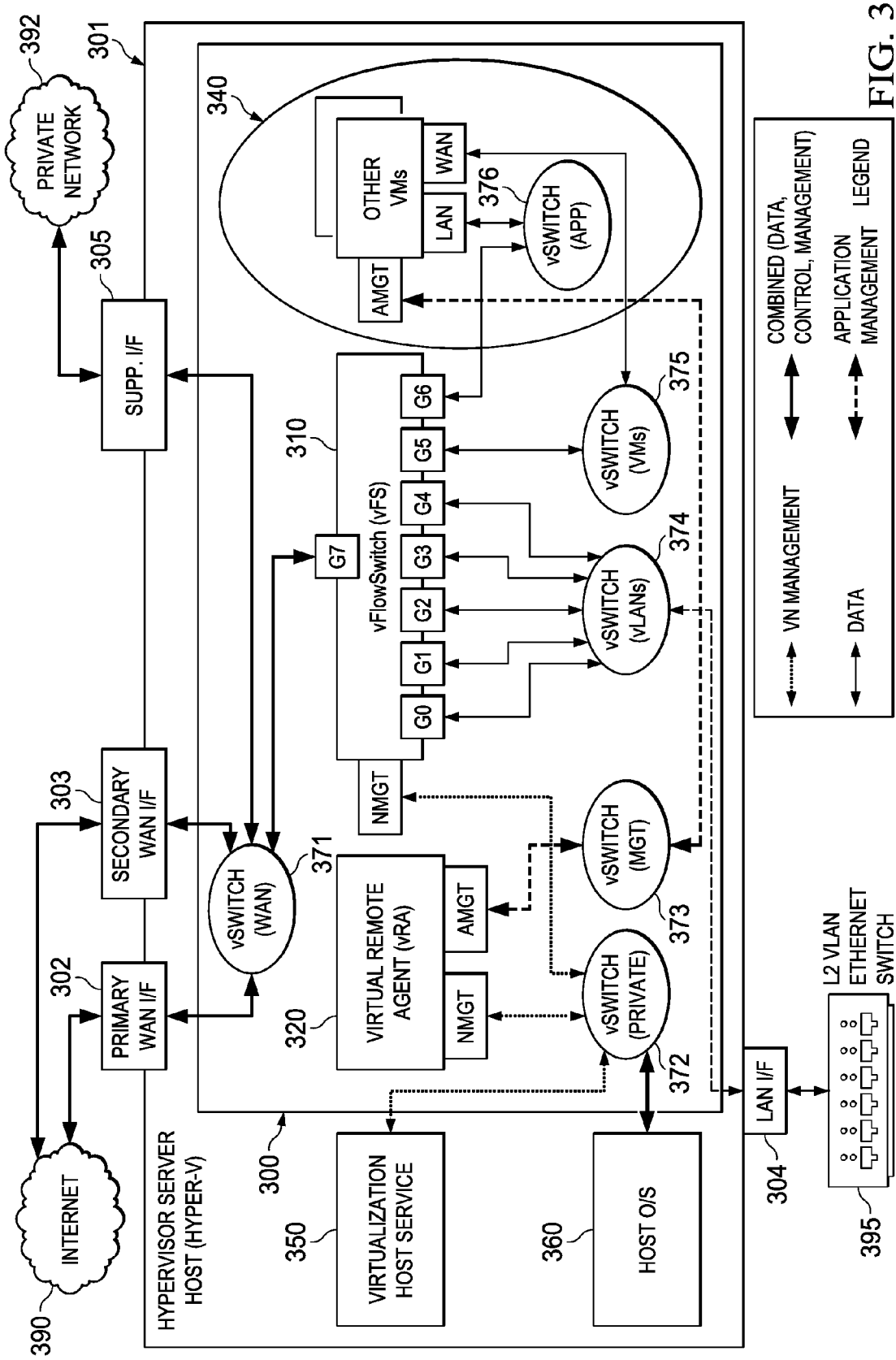
FIG. 3 illustrates a diagram of an embodiment virtual architecture for a distributed host device.

Embodiments of this disclosure provide virtual architectures for distributed host devices. FIG. 3 illustrates an embodiment virtual architecture 300 for a distributed host device 301 positioned in a branch office of a SMB client. As shown, the host device 301 includes a primary WAN interface 302 and a secondary WAN interface 303 configured to communicate over the internet 390, a LAN interface 304 configured to communicate with internal destinations via a virtual LAN (VLAN) Ethernet switch 395, and a supplemental interface 305 configured to communicate over a private network, e.g., a multi-protocol label switching (MPLS) network 392, etc. The host device 301 includes a virtual flow switch 310, a virtual remote agent 320, a plurality of virtual machines 340, and a virtualization host service 350, which are collectively referred to as virtual components 310-350. The virtual components 310-350 and a host operating system 360 are interconnected via links and virtual switches 371-376. These links are classified as combined links, data links, virtual network (VN) management links, and application management links, as indicated by the legend. Other link classifications may also be included in the virtual architecture 300.

Figure 4:
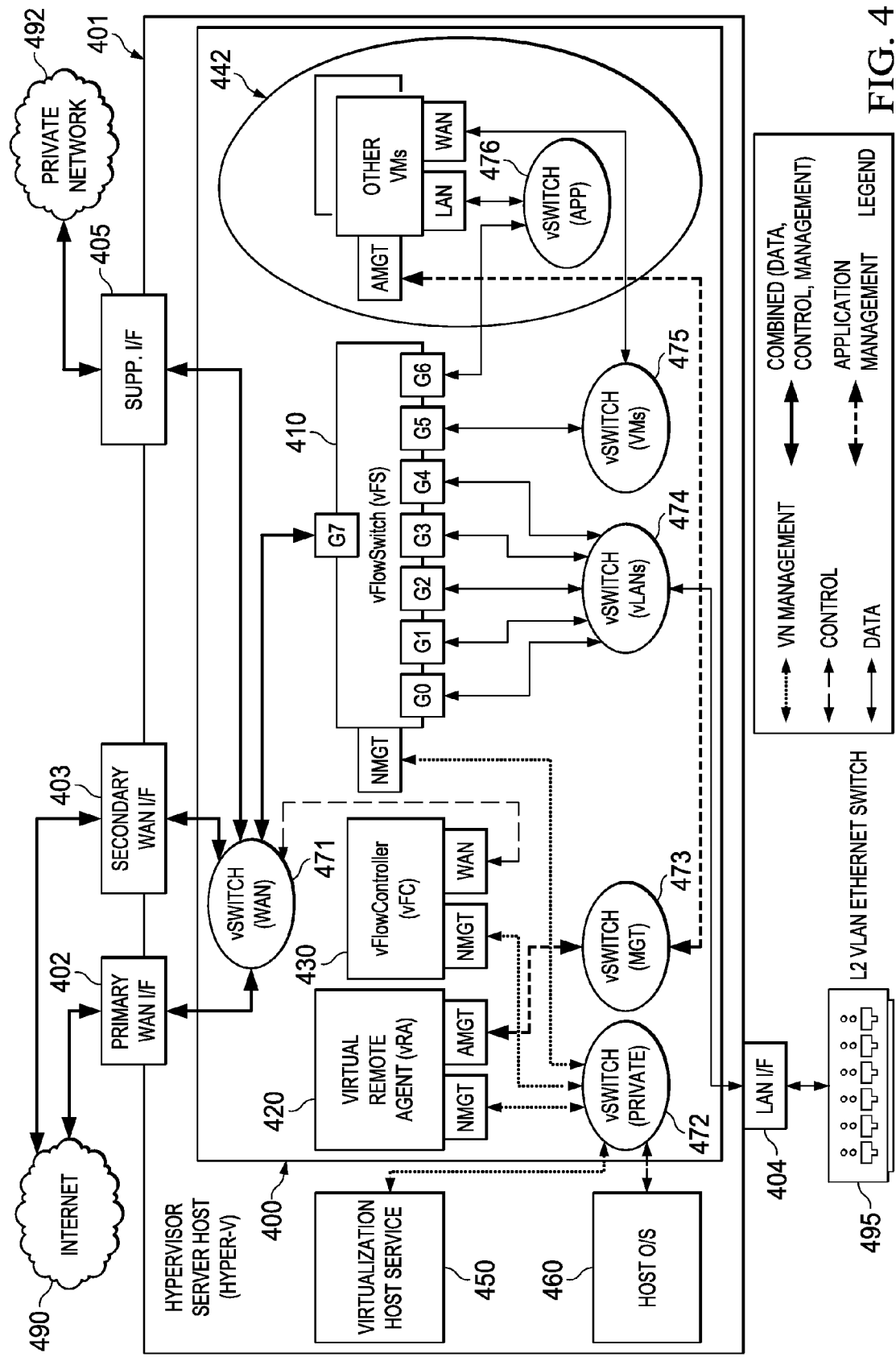
FIG. 4 illustrates a diagram of another embodiment virtual architecture for a distributed host device.

FIG. 4 illustrates an embodiment virtual architecture 400 for a distributed host device 401 positioned in a head office of an SMB client. As shown, the host device 401 includes a primary WAN interface 402 and a secondary WAN interface 403 configured to communicate over the internet 490, a LAN interface 404 configured to communicate with internal destinations via a virtual LAN (VLAN) Ethernet switch 495, and a supplemental interface 405 configured to communicate over a private network 492, e.g., a multi-protocol label switching (MPLS) network, etc. The host device 401 includes a virtual flow switch 410, a virtual remote agent 420, a virtual controller 430, a plurality of virtual machines 440, and a virtualization host service 450, which are collectively referred to as virtual components 410-450. The virtual components 410-450 and a host operating system 460 are interconnected via links and virtual switches 471-476. The links interconnecting the virtual components 410-460 and the host operating system 460 are classified as combined links, data links, control links, VN management links, and application management links, as indicated by the legend. Other link classifications may also be included in the virtual architecture 400.

The combined data links in the virtual architectures 300, 400 may include each of the other link classifications. For example, the combined data links in the virtual architectures 300, 400 may include a multiplexed combination of data links, control links, virtual network (VN) management links, and application management links. The data links may carry data in the virtual edge network. The data may include incoming data communicated from an external source (e.g., from the internet 390, 490) to an internal destination (e.g., device connected to Ethernet switch 395, 495), as well as outgoing data communicated from an internal source to an external destination. The data may also include internal data communicated from an internal source to an internal destination. The control links may carry control signaling in the virtual edge network. Control signaling may include signaling communicated from the virtual controller 430 to other virtual machines in the virtual edge network, e.g., the virtual flow switches 310, 410, etc., and vice-versa. The VN management links and application management links may carry management signaling in the virtual edge network. Management signaling may include signaling communicated from a virtual commander to one of the virtual remote agents 320, 420, as well as signaling instructions communicated from the virtual remote agents 320, 420 to other virtual machines in the virtual edge network.

Figure 5:
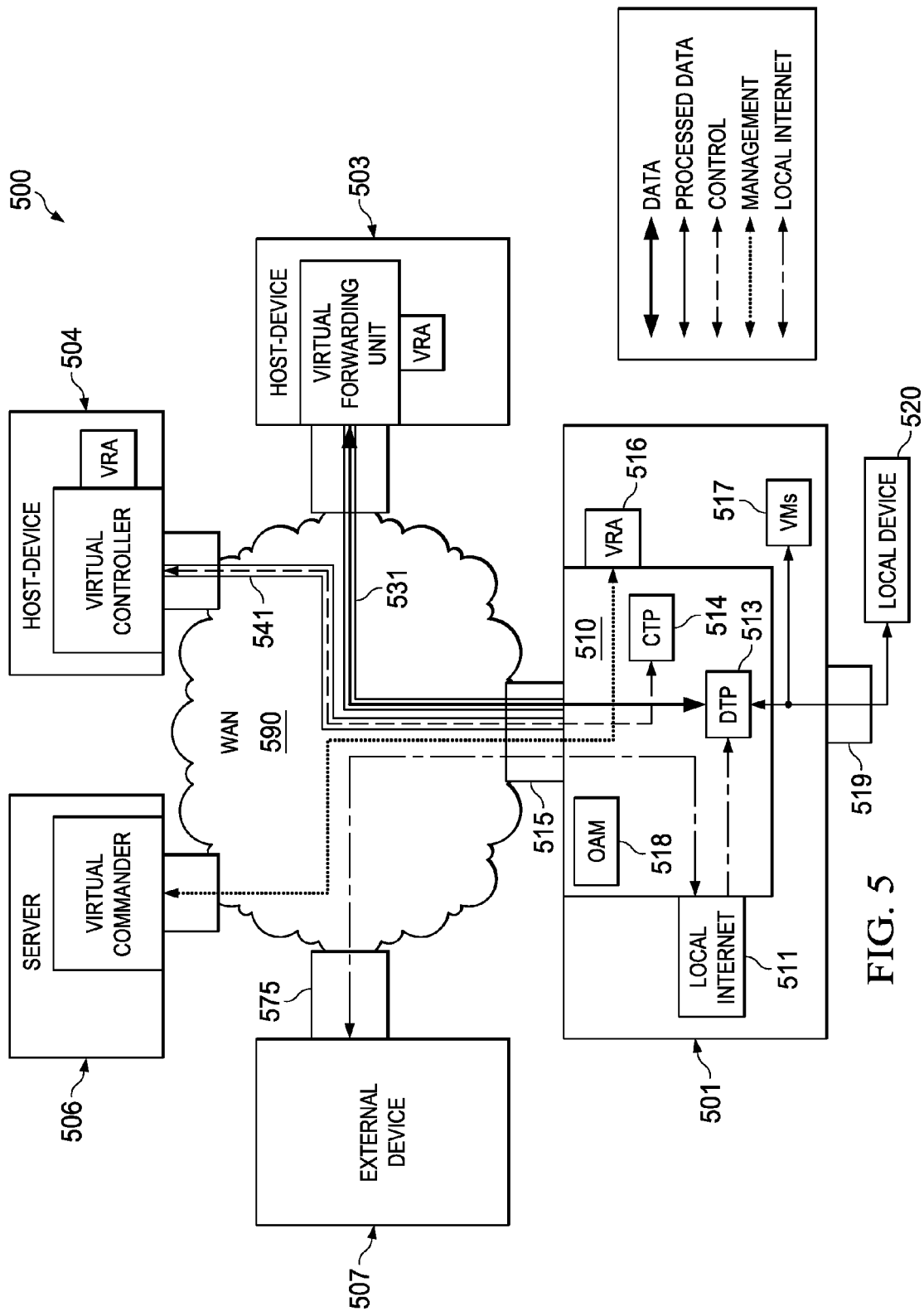
FIG. 5 illustrates a diagram of an embodiment virtual edge routing architecture adapted for WAN overloading at a distributed host device.

As mentioned above, multiple virtual machines instantiated on a common host device may share the same WAN interface. FIG. 5 illustrates a virtual edge routing architecture 500 adapted for WAN overloading at a local host device 501 positioned in a branch-office of an SMB client, which is configured to communicate with remote host devices 503, 504, a server 506, and an external destination 507 through a single WAN interface 515. As shown, the local host device 501 includes a virtual forwarding unit 510, a WAN interface 515, a virtual remote agent 516, a plurality of virtual machines 517, and a LAN interface 519.

The virtual forwarding unit 510 includes a local internet port 511, a data tunnel processing module 513, a control tunnel processing module 514, and an OAM module 518. The virtual forwarding unit 510 may be configured to process incoming and outgoing traffic communicated over the WAN interface 515 of the local host device 501. More specifically, the virtual forwarding unit 510 encrypts and encapsulates outgoing data and control signaling. The virtual forwarding unit 510 also monitors outgoing management signaling and local internet signaling to track existing remote agent sessions and existing local internet sessions, respectively. Moreover, the virtual forwarding unit 510 classifies incoming data and control signaling transported over the tunnels 541, 531 as tunneled traffic. The virtual forwarding unit 510 classifies incoming management signaling as remote-agent traffic, and incoming local internet signaling as local internet traffic. Notably, the incoming local internet traffic may be identified based by comparing the source address of the incoming packets with destination addresses of existing local internet sessions. For example, a local internet session between the local device 520 and the external device 507 may be established when the local device 520 sends outgoing local internet traffic to the external device 507. The established local internet session may specify a global IP address assigned to the external device 575.

Upon being validated, the tunneled data traffic and local internet traffic is forwarded to the data tunnel processing (DTP) module 513, where it is distributed to virtual machines 517 within the local host device 501, or to local devices connected to a LAN interface 519 of the local host device 501. Upon validation, the tunneled control traffic is forwarded to the control tunnel processing (CTP) module 514, where it is processed and stored as control information of the virtual forwarding unit 520, e.g., routing tables, routing protocols, etc. Validated remote-agent traffic is forwarded to the virtual remote agent 516. While not depicted in FIG. 5 for purposes of clarity, packets for measuring the connectivity and service quality of the data tunnel 541 and control tunnel 531 may also be received over the WAN interface 515. Such packets may be classified as tunnel-related control traffic, and may be processed by the OAM module 518 upon being validated. Tunnel-related control traffic may typically include simple packets designed to be reflected back from a receiver to the sending device. In some situations, the OAM module 518 is the sender, and the received packets are processed at the OAM module 518. In other situations, the OAM module 518 reflects the received packets back over the data tunnel 541 and/or control tunnel 531.

Figure 6:
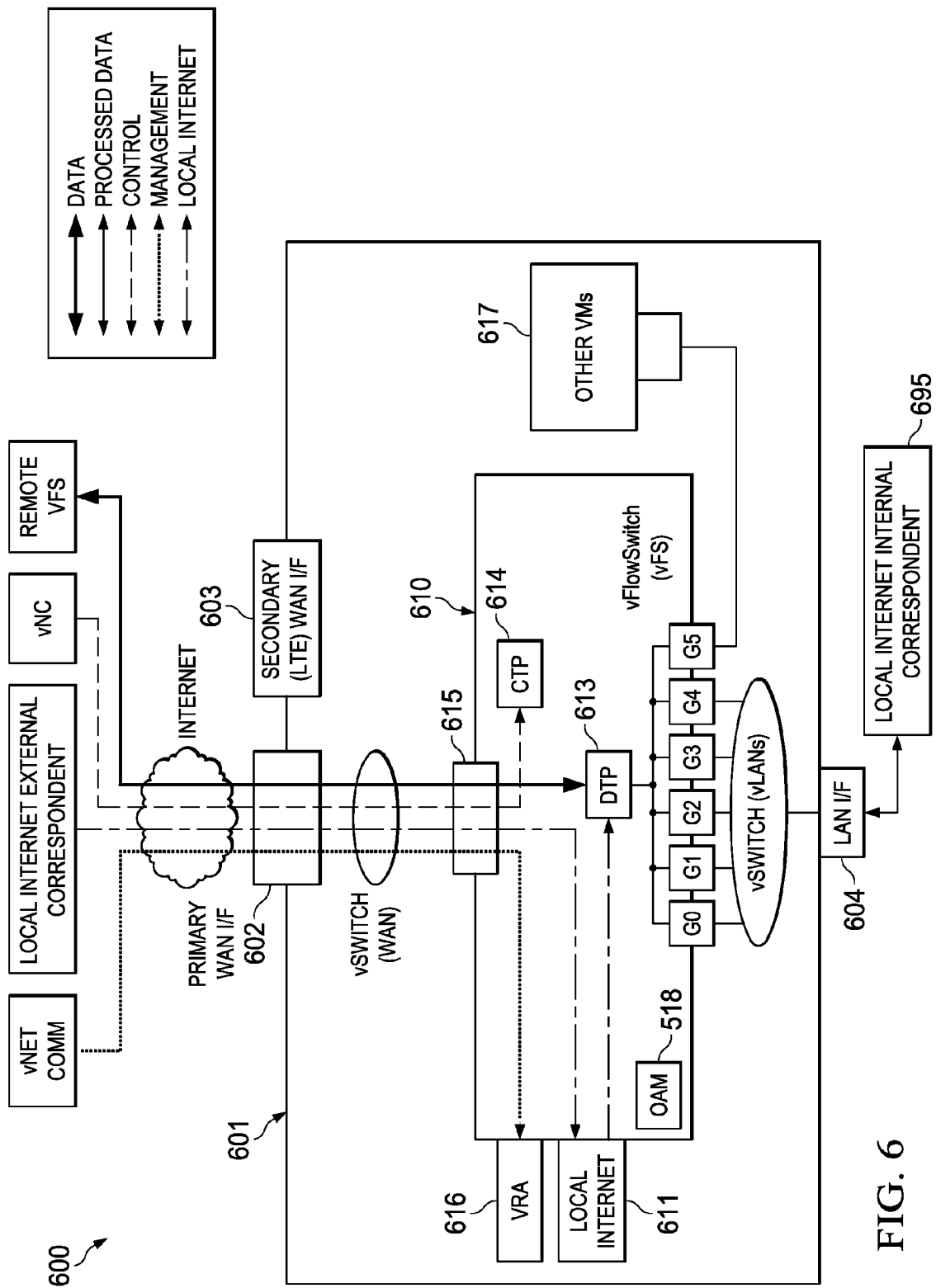
FIG. 6 illustrates a diagram of an embodiment distributed host device adapted for WAN overloading.

FIG. 6 illustrates an embodiment virtual architecture 600 for a distributed host device 601 positioned in a branch office of an SMB client. As shown, the distributed host device 601 includes a primary WAN interface 602, a secondary WAN interface 603, a LAN interface 604, a virtual forwarding unit 610, a virtual remote agent 616, and virtual machines 617. The secondary WAN interface 603 may be any supplemental interface of the distributed host device 601. In an embodiment, the secondary WAN interface 603 is a wireless interface, such as a radio interface configured to communicate in accordance with a wireless telecommunications protocol, e.g., long term evolution (LTE), Wi-Fi, or any other over-the-air protocol. The other components of the distributed host device 601 may be configured substantially similarly to the components of the local host device 501. The virtual forwarding unit 610 includes a local internet port 611, a data tunnel processing module 613, a control tunnel processing module 614, a WAN port 615, an OAM module 618, and a plurality of LAN ports (G0 through G5). The components of the virtual forwarding unit 610 may configured substantially similarly to the components of the virtual forwarding unit 510. The virtual forwarding unit 610 classifies incoming traffic received over the WAN port/interface 602/615, validates the incoming traffic, and forwards validated traffic to the appropriate component or interface. Tunnel-related control traffic is classified/validated by the virtual forwarding unit, and forwarded to the OAM module 618 for processing. Signaling associated with the tunnel-related control traffic is not depicted in FIG. 6 for purposes of clarity and concision.

Figure 7:
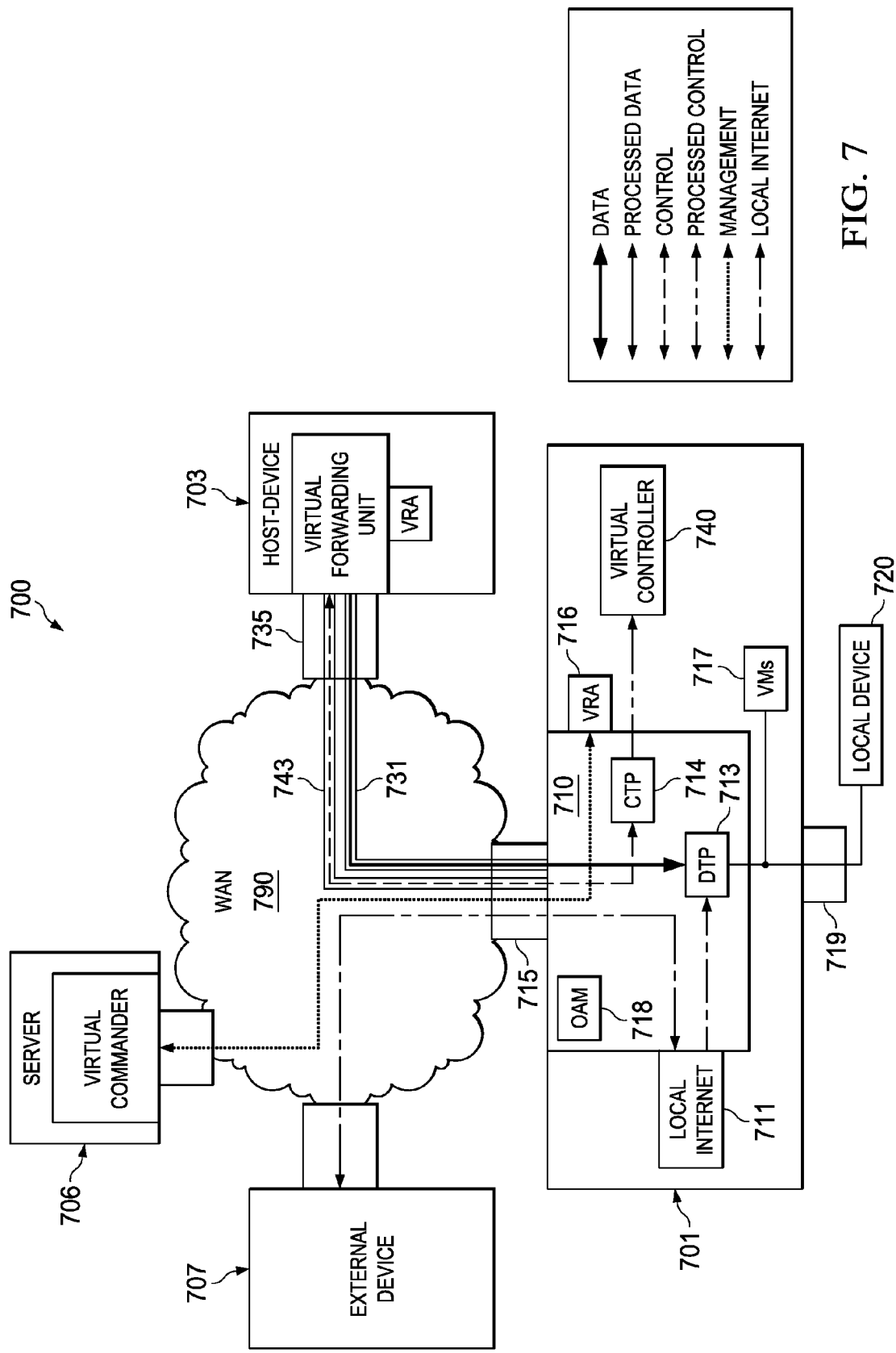
FIG. 7 illustrates a diagram of another embodiment virtual edge routing architecture adapted for WAN overloading at a distributed host device.

Host-devices located in head-offices may include a virtual controller as well as a virtual forwarding unit. In such devices, the control tunnel processing module of the virtual forwarding unit may be configured to forward at least some tunneled control traffic to the virtual controller. FIG. 7 illustrates a virtual edge routing architecture 700 adapted for WAN overloading at a local host device 701 in a head-office of an SMB client, which is configured to communicate with a remote host device 703, a server 706, and an external destination 707 through a single WAN interface 715. The local host device 701 includes a virtual forwarding unit 710, a WAN interface 715, a virtual remote agent 716, a plurality of virtual machines 717, and a LAN interface 719, which may be configured similarly to like-components of the local host device 501 of the virtual edge routing architecture 500. In addition, the local host device 701 includes a virtual controller 740, which constitutes a central control point of the virtual edge routing architecture 700. Similar to the virtual forwarding unit 510 in FIG. 5, the virtual forwarding unit 710 includes a local internet port 711, a data tunnel processing module 713, a control tunnel processing module 714, and an OAM module 718. These components of the virtual forwarding unit 710 are configured similar to the corresponding components of the virtual forwarding unit 510, with the exception that the control tunnel processing module 714 is configured to forward at least some control signaling to the virtual controller 740.

Figure 8:
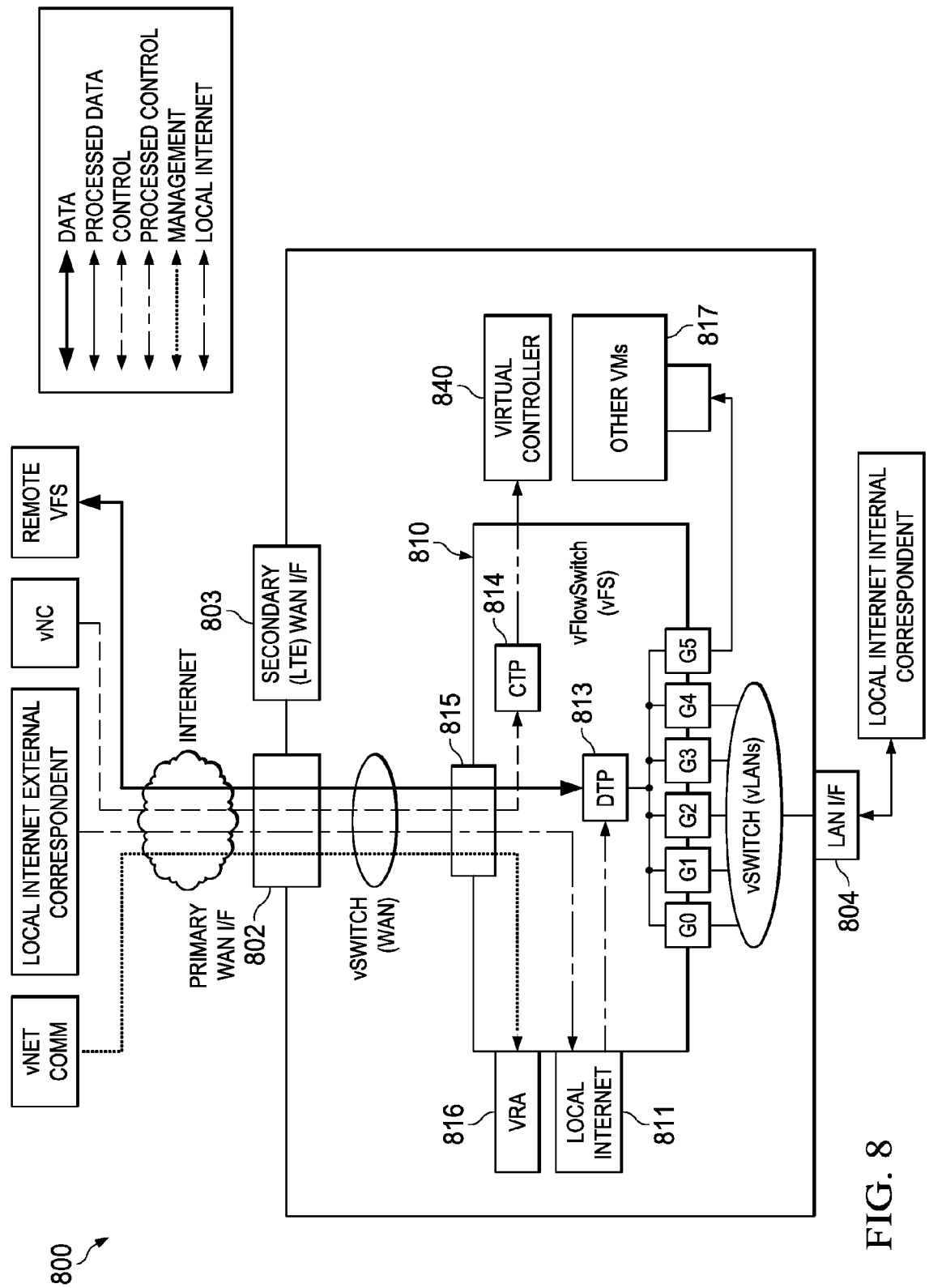
FIG. 8 illustrates a diagram of another embodiment distributed host device adapted for WAN overloading.

FIG. 8 illustrates an embodiment virtual architecture 800 for a distributed host device 801 positioned in a head office of an SMB client. As shown, the distributed host device 801 includes a primary WAN interface 802, a secondary WAN interface 803, a LAN interface 804, a virtual forwarding unit 810, a virtual remote agent 816, and virtual machines 817. The components of the distributed host device 801 may be configured similarly to corresponding components of the distributed host device 601, with the exception that the distributed host device 801 includes a virtual controller 840.

The virtual forwarding unit 810 includes a local internet port 811, a data tunnel processing module 813, a control tunnel processing module 814, a WAN port 815, an OAM module 818, and a plurality of LAN ports (G0 through G5). Components of the virtual forwarding unit 810 are configured similar to the corresponding components of the virtual forwarding unit 610, with the exception that the control tunnel processing module 814 is configured to forward at least some control signaling to the virtual controller 840.

Figure 9:
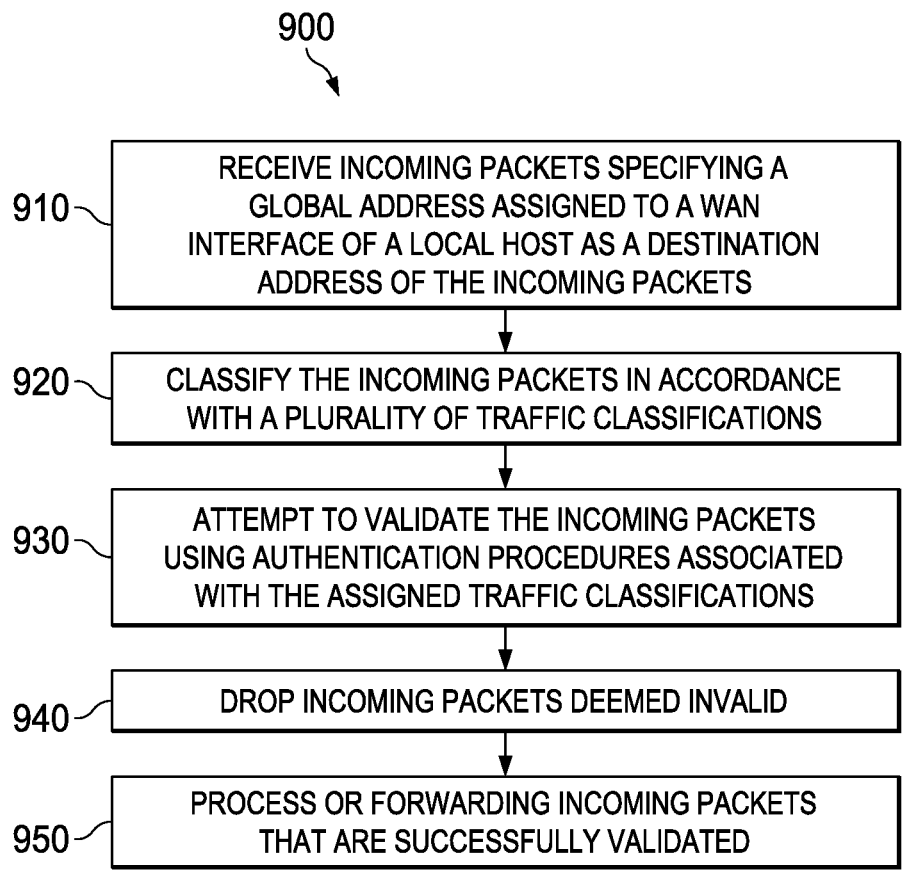
FIG. 9 illustrates a flowchart of an embodiment method for processing incoming packets received over a single WAN interface of a host device.

Aspects of this disclosure provide techniques for achieving WAN overloading on a single interface of a distributed host device. FIG. 9 illustrates a method 900 for processing incoming packets received over a single WAN interface of a host device. As shown, the method 900 begins at step 910, where incoming packets are received on a WAN interface of a local host device. The incoming packets specify a global address assigned to the WAN interface of the local host device. Next, the method 900 proceeds to step 920, where a virtual forwarding unit classifies the incoming packets in accordance with a plurality of traffic classifications. Thereafter, the method 900 proceeds to step 930, where the virtual forwarding agent attempts to validate the incoming packets using authentication procedures associated with the assigned traffic classifications. Embodiment techniques for classifying and validating incoming packets are described in greater detail below. Next, the method 900 proceeds to step 940, where the virtual forwarding agent drops incoming packets that are deemed invalid. Finally, the method 900 proceeds to step 950, where the virtual forwarding agent processes or forwards incoming packets that are successfully validated.

Figure 10A:
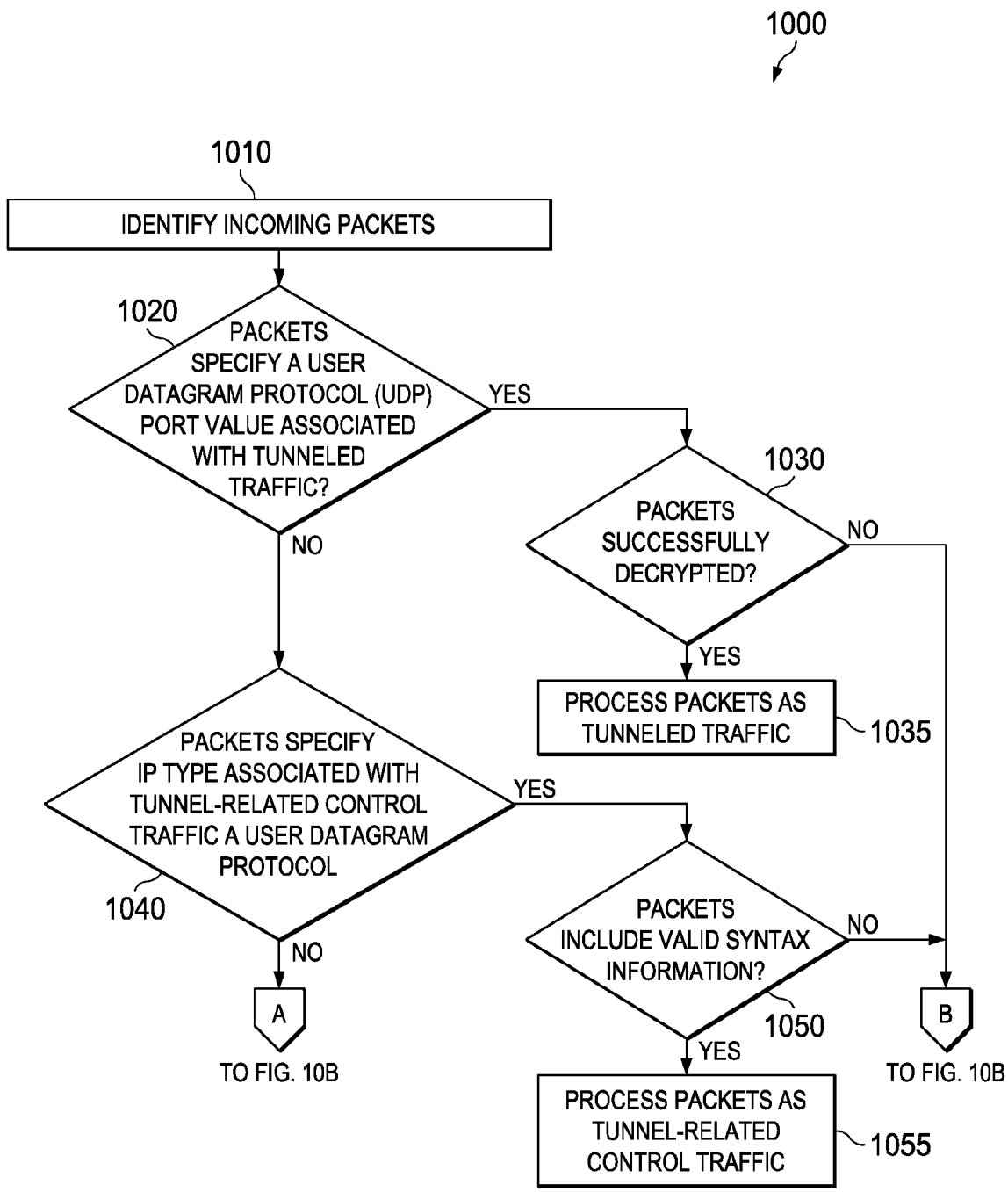
FIGS. 10A-10B illustrate a flowchart of an embodiment method for classifying and validating incoming packets received over a single WAN interface of a host device.
Figure 10B:
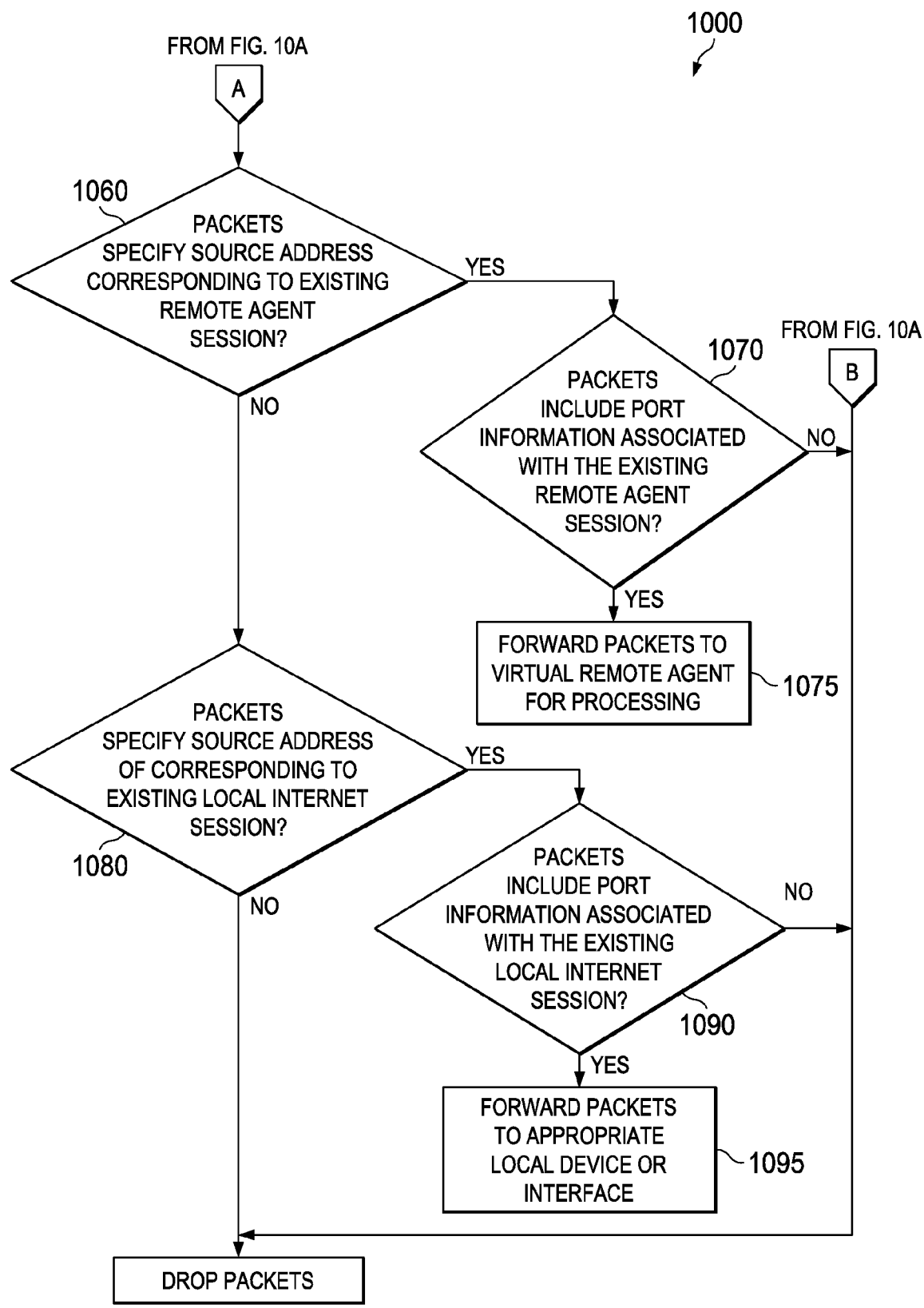

FIGS. 10A-10B illustrate a method 1000 for classifying and validating incoming packets. As shown, the method 1000 begins at step 1010, where incoming packets are identified. Thereafter, the method 1000 proceeds to step 1020, where a virtual forwarding unit determines whether the packets specify a UDP port value associated with tunneled traffic. If so, the method 1000 proceeds to step 1030, where the virtual forwarding unit attempts to decrypt the packets. Packets that are successfully decrypted are processed as tunneled traffic at step 1035. Packets that cannot be successfully decrypted are deemed invalid and dropped.

If the packets do not specify a UDP port value associated with tunneled traffic, then the method 1000 proceeds to step 1040, where the virtual forwarding unit determines whether the packets specify an IP type associated with tunnel-related control traffic. If so, the method 1000 proceeds to step 1050, where the virtual forwarding unit determines whether the packets have a valid syntax. Packets having a valid syntax are processed as tunnel-related control traffic at step 1055. Packets lacking a valid syntax are deemed invalid and dropped.

If the packets do not specify an IP type associated with tunnel-related control traffic, then the method 1000 proceeds to step 1060, where the virtual forwarding unit determines whether the packets specify a source address corresponding to an existing remote agent session. If so, the method 1000 proceeds to step 1070, where the virtual forwarding unit determines whether the packets include port information associated with the existing remote agent session. Packets including appropriate port information are forwarded to the virtual remote agent for processing at step 1075. Packets lacking appropriate port information are deemed invalid and dropped.

If the packets do not specify a source address corresponding to an existing remote agent session, then the method 1000 proceeds to step 1080, where the virtual forwarding unit determines whether the packets specify a source address corresponding to an existing local internet session. If so, the method 1000 proceeds to step 1090, where the virtual forwarding unit determines whether the packets include port information associated with the existing local internet session. Packets identifies as having appropriate port information are forwarded to the appropriate local internet internal correspondent at step 1095. Packets determined to lack appropriate port information are deemed invalid and dropped.

Figure 11:
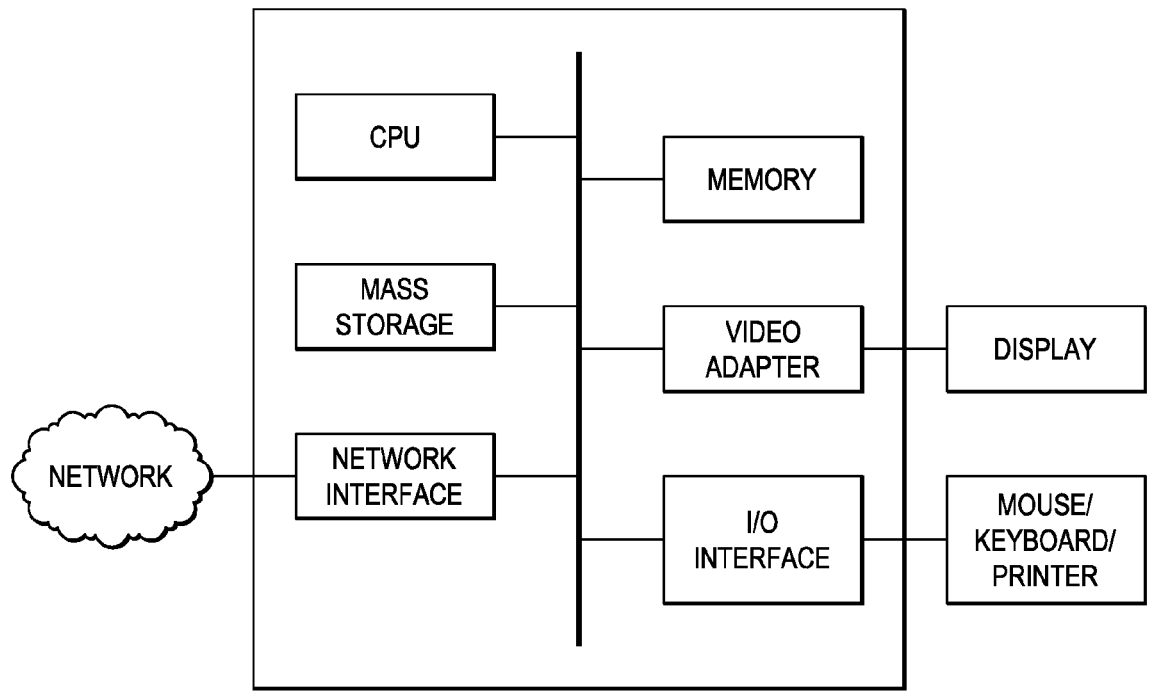
FIG. 11 illustrates a diagram of an embodiment computing platform.

FIG. 11 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 12:
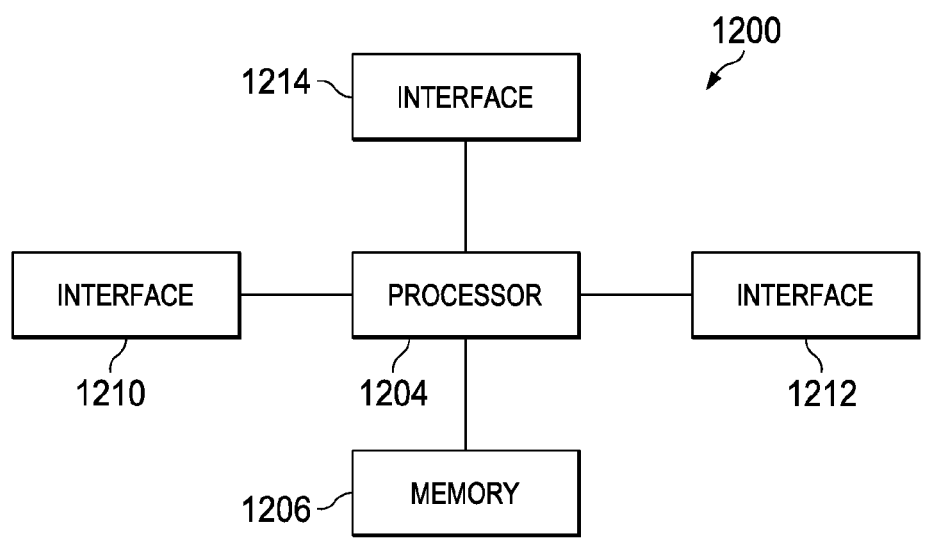
FIG. 12 illustrates a diagram of an embodiment communications device.

FIG. 12 illustrates a block diagram of an embodiment of a communications device 1200, which may be equivalent to one or more devices discussed above. The communications device 1200 may include a processor 1204, a memory 1206, and a plurality of interfaces 1210, 1212, 1214, which may (or may not) be arranged as shown in FIG. 12. The processor 1204 may be any component capable of performing computations and/or other processing related tasks, and the memory 1206 may be any component capable of storing programming and/or instructions for the processor 1204. The interfaces 1210, 1212, 1214 may be any component or collection of components that allows the communications device 1200 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for multiplexing traffic over a single interface of a distributed host device, the method comprising:
   receiving incoming packets over a wide area network (WAN) interface of a local host device, wherein one or more tunnels extend from the WAN interface of the local host device to remote WAN interfaces of remote host devices, and wherein the incoming packets are stored in a virtual data forwarding unit instantiated on the local host device;
   assigning one of a plurality of traffic classifications to the incoming packets, the plurality of traffic classifications including at least tunneled traffic, tunnel-related control traffic, and remote agent traffic, wherein the tunneled traffic classifies packets transported over the one or more tunnels, wherein the tunnel-related control traffic classifies packets communicated to measure a quality parameter of the one or more tunnels, and wherein the remote agent traffic classifies packets associated with a virtual remote agent instantiated on the local host device;
   attempting to validate the incoming packets using authentication procedures associated with the assigned traffic classifications, wherein different authentication procedures are associated with different traffic classifications, and wherein incoming packets deemed invalid are dropped from the virtual data forwarding unit; and
   processing or forwarding incoming packets that are successfully validated.

2. The method of claim 1, wherein assigning one of the plurality of traffic classifications to the incoming packets comprises:
   classifying incoming packets that specify a user datagram protocol (UDP) port value associated with the one or more tunnels as tunneled traffic.

3. The method of claim 2, wherein attempting to validate the incoming packets using authentication procedures associated with the assigned traffic classifications comprises:
   attempting to decrypt incoming packets classified as tunneled traffic in accordance with pre-defined decryption keys; and
   validating successfully decrypted packets, wherein packets that are unable to be decrypted are deemed invalid.

4. The method of claim 1, wherein assigning one of the plurality of traffic classifications to the incoming packets further comprises:
   classifying incoming packets that specify an internet protocol (IP) type associated with operations, administration and maintenance (OAM) activities as tunnel-related control traffic.

5. The method of claim 4, wherein attempting to validate the incoming packets using authentication procedures associated with the assigned traffic classifications comprises:
   determining whether incoming packets classified as tunnel-related control traffic have a proper syntax; and
   validating incoming packets having the proper syntax, wherein incoming packets determined to lack the proper syntax are deemed invalid.

6. The method of claim 1, wherein the method further comprises:
identifying existing remote agent sessions by monitoring outgoing packets originating from the virtual remote agent, wherein the existing remote agent sessions associate a destination addresses of the outgoing packets with port information of the outgoing packets.

7. The method of claim 6, wherein assigning one of the plurality of traffic classifications to the incoming packets comprises:
classifying, as remote agent traffic, incoming packets having a source address that matches a destination address specified by one of the existing remote agent sessions.

8. The method of claim 7, wherein attempting to validate the incoming packets using authentication procedures associated with the assigned traffic classifications comprises:
determining whether incoming packets classified as remote agent traffic include port information specified by the corresponding existing remote agent session; and
validating incoming packets that include port information specified by the corresponding existing remote agent session, wherein packets determined to lack port information specified by the corresponding existing remote agent session are deemed invalid.

9. The method of claim 7, wherein identifying existing remote agent sessions by monitoring outgoing packets originating from the virtual remote agent comprises:
receiving outgoing packets from the virtual remote agent, wherein the outgoing packets specify a local address assigned to the virtual remote agent as a source address of the outgoing packets; and
writing entries into a remote agent session table, the entries associating destination addresses of the outgoing packets with port information of the outgoing packets, wherein each entry in the session table corresponds to one of the existing remote agent sessions.

10. The method of claim 9, further comprising:
refreshing an existing remote agent session when a packet associated with the existing session is communicated over the WAN interface.

11. The method of claim 10, further comprising:
terminating an existing remote agent session when a timeout period expires prior to the existing remote agent session being refreshed.

12. The method of claim 1, wherein the plurality of traffic classifications further include local internet traffic, and wherein the local internet traffic classifies packets associated with existing local internet sessions.

13. The method of claim 12, wherein the method further comprises:
identifying existing local internet sessions by monitoring egress packets forwarded directly over the internet from the WAN port of the local host device, wherein the existing local internet sessions associate destination addresses of the egress packets with port information of the egress packets.

14. The method of claim 13, wherein assigning one of the plurality of traffic classifications to the incoming packets further comprises:
classifying, as local internet traffic, incoming packets having a source address that matches a destination address specified by one of the existing local internet sessions.

15. The method of claim 14, wherein attempting to validate the incoming packets using authentication procedures associated with the assigned traffic classifications comprises:
determining whether incoming packets classified as local internet traffic include port information specified by a corresponding one of the local internet sessions; and
validating incoming packets that include the port information specified by the corresponding local internet session, wherein packets determined to lack port information specified by the corresponding existing local internet session are deemed invalid.

16. The method of claim 1, wherein incoming packets classified as tunneled traffic are validated based on tunnel passwords, wherein incoming packets classified as tunnel-related control traffic are validated based on syntax information carried in the header of the incoming packets, and wherein incoming packets classified as remote agent traffic are validated based on port information carried in the header of the incoming packet.

17. A computer program product adapted for installation on a local host device of a virtual routing network, the computer program product comprising a non-transitory computer readable storage medium storing programming that includes instructions to:
receive incoming packets over a wide area network (WAN) interface of a local host device, wherein one or more tunnels extend from the WAN interface of the local host device to remote WAN interfaces of remote host devices, and wherein the incoming packets are stored in a virtual data forwarding unit instantiated on the local host device;
assign one of a plurality of traffic classifications to the incoming packets, the plurality of traffic classifications including at least tunneled traffic, tunnel-related control traffic, and remote agent traffic, wherein the tunneled traffic classifies packets transported over the one or more tunnels, wherein the tunnel-related control traffic classifies packets communicated to measure a quality parameter of the one or more tunnels, and wherein the remote agent traffic classifies packets associated with a virtual remote agent instantiated on the local host device;
attempt to validate the incoming packets using authentication procedures associated with the assigned traffic classifications, wherein different authentication procedures are associated with different traffic classifications, and wherein incoming packets deemed invalid are dropped from the virtual data forwarding unit buffer; and
process or forward incoming packets that are successfully validated.

18. The computer program product of claim 17, wherein the plurality of traffic classifications further include local internet traffic, and wherein the local internet traffic classifies packets associated with existing local internet sessions.

19. The computer program product of claim 18, wherein the instructions to assign one of the plurality of traffic classifications to the incoming packets include instructions to:
classify incoming packets that specify a user datagram protocol (UDP) port value associated with the one or more tunnels as tunneled traffic
classify incoming packets that specify an internet protocol (IP) type associated with operations, administration and maintenance (OAM) activities as tunnel-related control traffic classify, as remote agent traffic, incoming packets having a source address that matches a destination address specified by one of the existing remote agent sessions; and classify, as local internet traffic, incoming packets having a source address that matches a destination address specified by one of the existing local internet sessions.

20. The computer program product of claim 19, wherein incoming packets classified as tunneled traffic are validated based on tunnel passwords, wherein incoming packets classified as tunnel-related control traffic are validated based on a syntax associated with the incoming packets, wherein incoming packets classified as remote agent traffic and local internet traffic are validated based on port information carried in the header of the incoming packets.

\* \* \* \* \*

UNITED STATES PATENT AND TRADEMARK OFFICE
CERTIFICATE OF CORRECTION

| | | |
|---|---|---|
| PATENT NO. | : 9,590,911 B2 | Page 1 of 1 |
| APPLICATION NO. | : 14/749317 | |
| DATED | : March 7, 2017 | |
| INVENTOR(S) | : Lance Arnold Visser | |

It is certified that error appears in the above-identified patent and that said Letters Patent is hereby corrected as shown below:

In the Claims

In Column 14, Line 50, Claim 17, delete "buffer".

Signed and Sealed this
First Day of August, 2017

Joseph Matal
*Performing the Functions and Duties of the*
*Under Secretary of Commerce for Intellectual Property and*
*Director of the United States Patent and Trademark Office*